United States Patent
Friedmann et al.

(10) Patent No.: US 6,361,470 B1
(45) Date of Patent: Mar. 26, 2002

(54) ADJUSTABLE PULLEY FOR FLUID-OPERATED TRANSMISSIONS

(75) Inventors: Oswald Friedmann, Lichtenau-Ulm; Bernhard Walter, Oberkirch, both of (DE)

(73) Assignee: LüK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/578,602

(22) Filed: May 25, 2000

(30) Foreign Application Priority Data

May 27, 1999 (DE) .......................... 199 24 224

(51) Int. Cl.⁷ .................. B60R 41/12; F16H 59/00; F16H 61/00; F16H 63/00
(52) U.S. Cl. .............. 477/37; 477/38; 477/42; 477/45; 474/28
(58) Field of Search .............. 477/37, 38, 42, 477/44, 45; 474/28, 29, 30, 8, 11

(56) References Cited

U.S. PATENT DOCUMENTS

| | | | | |
|---|---|---|---|---|
| 4,547,178 A | * | 10/1985 | Hayakawa et al. .......... | 474/11 |
| 4,722,718 A | * | 2/1988 | Eugen ..................... | 474/19 |
| 5,667,448 A | | 9/1997 | Friedmann ................ | 474/18 |
| 5,711,730 A | | 1/1998 | Friedman et al. .......... | 474/18 |
| 5,879,453 A | | 3/1999 | Friedmann et al. ......... | 474/18 |
| 6,190,274 B1 | * | 2/2001 | Walter ................... | 474/28 |

* cited by examiner

*Primary Examiner*—Sherry Estremsky
*Assistant Examiner*—Tisha D. Lewis
(74) *Attorney, Agent, or Firm*—Darby & Darby

(57) ABSTRACT

An adjustable pulley for use in a continuous variable transmission in the power train of a motor vehicle has an axially fixed first conical flange and an axially movable second conical flange. The hydraulic control system which moves the second flange relative to the first flange is provided with at least one first plenum chamber which receives pressurized fluid when the second flange is to move toward the first flange, and with an additional plenum chamber which receives pressurized fluid when the second flange is to move away from the first flange. The admission of pressurized fluid into the additional chamber is regulated in dependency upon the RPM of the flanges. Rapid evacuation of pressurized fluid from the additional chamber can take place by way of a relief valve which opens when the pressure of fluid in the additional chamber rises to a preselected value. This renders it possible to rapidly shift between overdrive and underdrive.

16 Claims, 3 Drawing Sheets

ADJUSTABLE PULLEY FOR FLUID-OPERATED TRANSMISSIONS

BACKGROUND OF THE INVENTION

The invention relates to improvements in continuously variable transmissions, e.g., so-called CVT transmissions which are frequently employed in the power trains of motor vehicles, and more particularly to improvements in adjustable pulleys or sheaves which are utilized in such transmissions.

Transmissions of the above outlined character comprise adjustable pulleys wherein a first flange is movable axially toward and away from a fixed second flange by a hydraulic control system which employs one or more plenum chambers and a system of valves serving to regulate the flow of oil or another hydraulic fluid into and from the chamber(s). It is also known to counteract the adverse influence of centrifugal force upon the circulating body or bodies of hydraulic fluid in the plenum chamber(s) by resorting to an additional or extra plenum chamber and by providing a path for controlled gradual outflow of fluid from the additional chamber. Reference may be had, for example, to published German patent application Serial No. 195 44 644 A1.

A drawback of presently known adjustable pulleys wherein the hydrulic adjusting or control system employs an additional plenum chamber and means for permitting gradual evacuation or expulsion of pressurized fluid from the additional chamber is that the fluid which is confined in the additional chamber opposes or prevents rapid shifting of the transmission between overdrive and underdrive or permits such shifting only if the hydraulic system which initiates and effects axial movements of the adjustable flange operates with a hydraulic fluid that is maintained at an extremely high pressure.

OBJECTS OF THE INVENTION

An object of the present invention is to provide a novel and improved adjustable pulley of the type wherein one of two coaxial flanges is movable axially toward and away from the other flange.

Another object of the invention is to provide a continuously variable transmission which employs one or more improved adjustable pulleys.

A further object of the invention is to provide a novel and improved hydraulic adjusting or control system for use in conjunction with the above outlined improved adjustable pulley.

An additional object of the instant invention is to provide a pulley wherein a first flange (such as a conical flange) is movable relative to a second flange at a desired speed and to any one of a number of different positions without being influenced by the rotational speed (and hence by centrifugal force acting upon the body or bodies of circulating fluid in the control system) of the pulley.

Still another object of the invention is to provide a novel and improved valve for use in the hydraulic control system of an adjustable pulley.

A further object of the invention is to provide a pulley which can be utilized with advantage in a transmission serving to drive the differential in the power train of a motor vehicle.

Another object of the invention is to provide a method of eliminating or reducing the influence of centrifugal force upon the circulating body or bodies of fluid in the hydraulic control system for an adjustable pulley.

An additional object of the invention is to provide a pulley which can be utilized with advantage as a superior substitute for heretofore known adjustable pulleys in continuously variable transmissions.

SUMMARY OF THE INVENTION

One feature of the present invention resides in the provision of an adjustable pulley or sheave which comprises a shaft rotatable about a predetermined axis at a plurality of different speeds, a first flange which shares all rotary movements of and can be of one piece with the shaft, a second flange which is rotatable with and movable axially of the shaft toward and away from the first flange, and fluid-operated means for moving the second flange toward and away from the first flange. Such moving means includes at least one first chamber which is arranged to receive a hydraulic fluid to thus generate a first force tending to move the second flange toward the first flange, and an additional chamber which serves to receive and confine hydraulic fluid at a plurality of different pressures to thus generate a variable second force tending to move the second flange away from the first flange. The improved adjustable pulley further comprises a valve which is rotatable with the shaft and serves to regulate the outflow of hydraulic fluid from the second chamber in dependency upon the rotational speed of he shaft.

The additional chamber can be provided with at least one outlet for the flow of hydraulic fluid, and the valve can include at least one mobile valving element which serves to regulate the outflow of hydraulic fluid from the additional chamber by way of the at least one outlet. Such valve can further comprise a valve body or housing for the at least one mobile valving element, and such valve body is connected for rotation (e.g., of one piece) with the shaft, with the first flange or with the second flange. The at least one outlet is provided in the valve body.

The mode of operation of the valve (which can be said to constitute a relief valve) can be such that the at least one valving element is movable, under the action of centrifugal force, to a first position in which it seals the at least one outlet, and to at least one second position—in which the at least one outlet is open—when the second force increases to a predetermined value (e.g., in response to an increase in the pressure of fluid filling the at least one first chamber). The second force varies or can vary as a function of variations of fluid pressure in the additional chamber.

The valve body is or can be provided with a seat for the a least one valving element, and such valving element is being acted upon by centrifugal force when the shaft rotates so that the valving element bears upon the seat with a force which increases in response to increasing centrifugal force. The at least one outlet can include a channel which is provided in the valve body and is inclined relative to the common axis of the flanges. The magnitude of the third force can exceed the magnitude of the second force by a value which is at least substantially independent of the magnitude of centrifugal force acting upon the body of fluid in the additional chamber and being opposed by the at least one valving element.

The at least one valving element can constitute a sphere, particularly a sphere having a substantial mass.

The inlet or inlets for admission of hydraulic fluid into the additional chamber can be in communication with that portion of the additional chamber which is nearest to the common axis of the flanges.

The at least one first chamber and/or the additional chamber can be defined by a first wall which is affixed to or forms part of the shaft, and by a second wall which is affixed to the second (axially movable) flange. One of these walls is disposed between the at least one first chamber and the additional chamber.

Another feature of the present invention resides in the provision of a continuously variable transmission which comprises a first adjustable pulley that is rotatable about a first axis, and a second adjustable pulley which is rotatable about a second axis by way of an endless flexible element (e.g., a link chain) which is strained over the pulleys. The second pulley comprises a shaft which is rotatable about the second axis, a first flange which is rotatable with the shaft, a second flange which is rotatable with and is movable axially of the shaft toward and away from the first flange, and fluid-operated operated means for moving the second flange toward and away from the first flange. The moving means includes at least one first chamber which serves to receive a hydraulic fluid to thus generate a first force tending to move the second flange toward the first flange, and an additional chamber which serves to receive and confine hydraulic fluid at a plurality of different pressures to thus generate a variable second force tending to move the second flange away from the first flange. The second pulley further comprises a valve which is rotatable with the shaft and is spaced apart from the second axis and serves to regulate the outflow of hydraulic fluid from it the second chamber in dependency upon the rotational speed of the shaft.

In accordance with a presently preferred embodiment, the valve comprises a valve body which shares rotary movements of the shaft about the second axis and has a channel which is inclined relative to the second axis and is provided with a seat, and a valving element which is movable in the channel against the seat under the action of centrifugal force which develops in response to rotation of the shaft about the second axis so that the force with which the valving element bears upon the seat to prevent the outflow of fluid from the additional chamber by way of the channel increases in response to increasing rotational speed of the shaft about the second axis.

The force (SK) with which the valving element bears upon the seat under the action of centrifugal force can be determined in accordance with the equation $$SK = F \times \sin \alpha$$

wherein F is the centrifugal force acting upon the valving element and a is the extent of inclination of the channel relative to the second axis.

The first and additional chambers can receive hydralic fluid from a pump and discharge hydraulic fluid into a reservoir by way of channels, bores and ports provided in the shaft of the second adjustable pulley. Such shaft can transmit torque which serves to drive the wheels of a motor vehicle.

The novel features which are considered as characteristic of the invention are set forth in particular in the appended claims. The improved adjustable pulley itself, however, both as to its construction and the mode of installing and utilizing the same in a continuously variable transmission, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
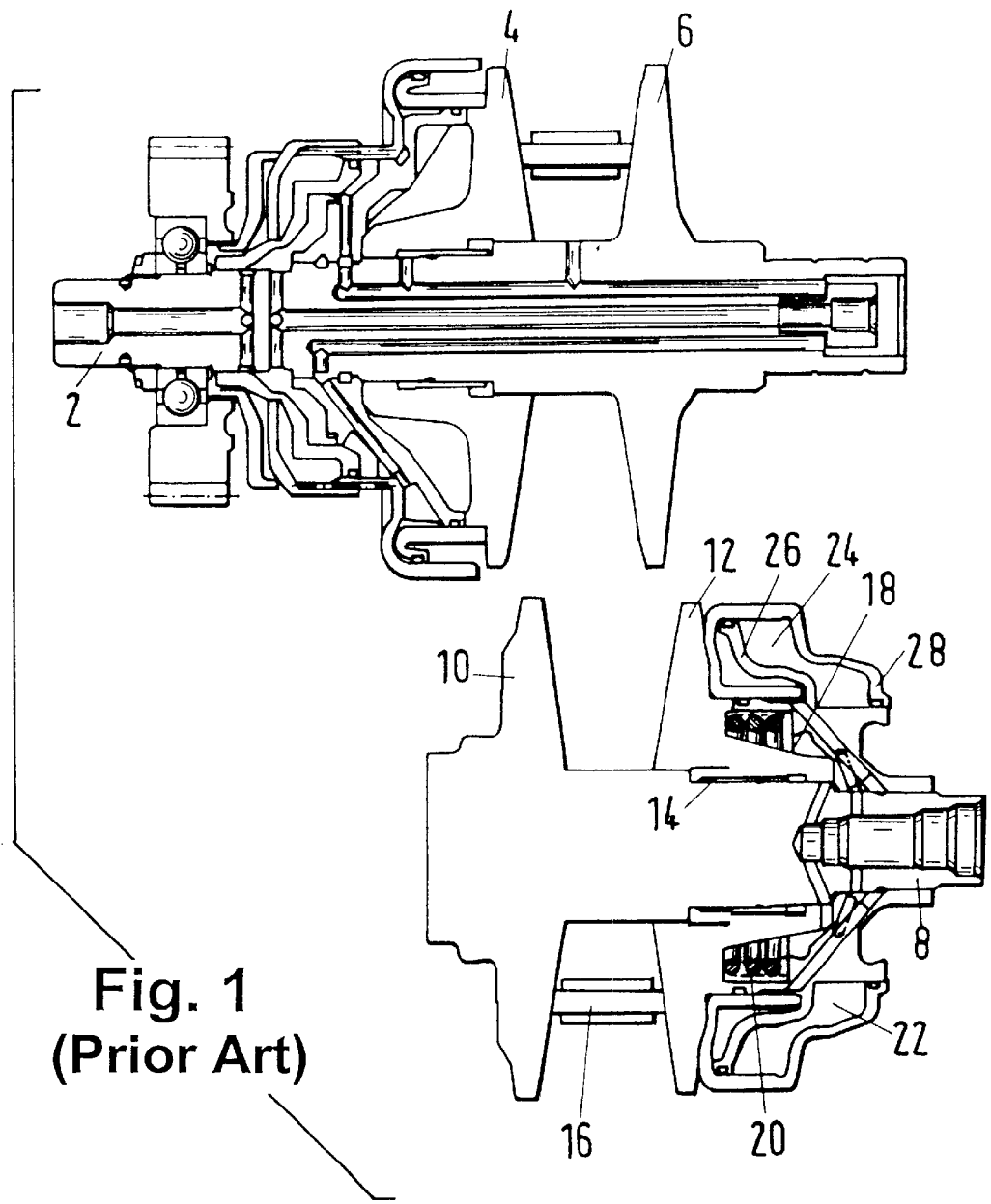
FIG. 1 is a fragmentary schematic partly elevational and partly axial sectional view of a continuously variable transmission employing two adjustable pulleys or sheaves of conventional design.

FIG. 1 shows a portion of a continuously variable transmission 1 (known as CVT) of the type disclosed in the aforementioned published German patent application Serial No. 195 44 644 A1. The transmission 1 comprises a first shaft 2 which can receive variable torque from the rotary output element of a prime mover (such as the combustion engine of a motor vehicle), e.g., by way of a clutch assembly and a torque sensor in a manner as disclosed, for example, in commonly owned U.S. Pat. No. 5,667,448 (granted Sep. 16, 1997 to Oswald Friedmann for "POWER TRAIN") or in commonly owned U.S. Pat. No. 5,711,730 (granted Jan. 27, 1998 to Oswald Friedmann and Armin Veil for "TORQUE MONITORING APPARATUS"). The disclosure of our German priority application Serial No. 199 24 224.0 (filed May 27, 1999), as well as the disclosures of all U.S. and foreign patents and patent applications identified in this specification, are incorporated herein by reference.

Referring again to FIG. 1, the shaft 2 carries a first adjustable pulley or sheave 3 including an axially fixed conical flange 6 which is or which can be of one piece with the shaft 2, and a second conical flange 4 having internal teeth 5 mating with external teeth or splines of the shaft 2. Thus, the flange 4 is compelled to rotate with the shaft 2 but is movable axially of this shaft toward and away from the axially fixed flange 6. The transmission 1 further comprises a second adjustable pulley or sheave 9 mounted on a shaft 8 which is parallel to the shaft 2. The pulley 9 includes a first conical flange 10 which is compelled to share all movements of the shaft 8 (the illustrated flange 10 is of one piece with the shaft 8), and a second conical flange 12 which is movable axially of the shaft 8 toward and away from the flange 10. The flange 12 has internal teeth 14 mating with external teeth or splines of the shaft 8 so that the flange 12 cannot turn relative to the flange 10.

An endless flexible element 16 (e.g., a link chain) has portions trained over the pulleys 3, 9 so that the end faces of its links engage the conical surfaces of the flanges 4, 6 and 10, 12. In order to change the ratio of the transmission 1, the flange 4 must be shifted axially toward the flange 6 and the flange 12 must be shifted axially away from the flange 10, or vice versa. If the transmission 1 is mounted in the power train of a motor vehicle in such a way that the shaft 2 receives torque from the prime mover, the shaft 8 can serve to transmit torque to a differential, i.e., to the axles of driven wheels in the motor vehicle.

The manner in which a flange is movable relative to the respective axially fixed flange is shown schematically in the lower half of FIG. 1. The illustrated means for moving the flange 12 axially of the shaft 8 comprises a hydraulic control system defining a composite first plenum chamber including two annular plenum chambers, namely an inner plenum chamber 18 nearer to and an outer plenum chamber 22 more distant from the axis of the shaft 8. When the fluid pressure in the inner chamber 18 is raised, the flange 12 moves axially toward the flange 10. The pressure of hydraulic fluid (such as oil or ATF=automatic transmission fluid) in the chamber 18 is normally increased as a function of increasing rotational speed of the shaft 8. A coil spring 20 (or an equivalent spring) in the chamber 18 tends to move the flange 12 axially and away from the axially fixed flange 10.

The plenum chamber 22 serves to select the axial distance between the flanges 10, 12, namely to select the force with which the conical surfaces of these flanges bear upon the end faces of adjacent links forming part of the chain 16. The shaft 8 is provided with axially extending bores or channels and with radially extending bores or ports which serve to supply hydraulic fluid into and to permit outflow of hydraulic fluid from the chambers 18 and 22. Reference may be had to the aforementioned U.S. Pat. No. 5,711,310 to Friedmann et al. The pressures of fluid streams flowing into the chambers 18, 22 are regulated by a system of valves of the type shown, for example, in U.S. Pat. No. 5,667,448 to Friedmann.

The mode of adjusting the pulley 3 (by moving the flange 4 axially of the shaft 2 toward and away from the flange 6) is or can be analogous to the just described mode of moving the flange 12. It will be appreciated that the illustrated transmission 1 constitutes but one of various types of continuously variable transmissions which can be modified and improved in accordance with the present invention. For example, the means for moving the adjustable flange 4 and/or 12 can comprise a single plenum chamber (such as 18 or 22) or more than two plenum chambers.

All presently known continuously variable transmissions wherein one flange of at least one adjustable pulley for an endless chain or the like is adjustable by hydraulic fluid in one or more plenum chambers share the drawback that the plenum chamber(s) rotates or rotate with the pulley and, consequently, the annular body of hydraulic fluid in each rotating plenum chamber is subjected to the action of centrifugal force. This entails a rise of fluid pressure in the rotating chamber, and such rise varies as a function of changes of rotational speed of the shaft for the respective pulley. In other words, the force with which an axially movable flange is urged axially of the shaft of the respective pulley, and hence the transmission ratio, varies or tends to vary at times and/or under circumstances when a change of the transmission ratio is not desired (i.e., unnecessary) or plain dangerous. Such undesirable adjustments are attributable to the influence of centrifugal force upon the pressure of hydraulic fluid in the plenum chamber or chambers of a pulley, and this undesirable influence of centrifugal force cannot be overcome by valves which are employed in presently known hydraulic control systems for the flow of fluid into and from the plenum chamber(s).

One of the presently known attempts to counteract the effect of centrifugal forces upon circulating bodies of a hydraulic fluid in the chambers 18 and 22, i.e., in the chambers of that pulley (9) which normally rotates at a higher speed than the other pulley (3) when the vehicle is driven by its engine, is shown in FIG. 1. Thus, the hydraulic control system for the axially movable flange 12 defines an additional or further or extra plenum chamber 24 which can be called a balancing or compensating chamber. This chamber is bounded by a wall 26 which is rigid with and extends substantially radially outwardly from the shaft 8, and a second at least substantially radially extending wall 28 which is rigid with the axially movable flange 12. The walls 26, 28 also bound the chamber 22, and the wall 26 separates the chamber 22 from the chamber 24. The axially movable flange 12 is moved away from the flange 10 when the volume of the additional chamber 24 is caused to increase. In other words, the body of fluid in the chamber 24 opposes the tendency of fluids in the chambers 18, 22 to move the flange 12 axially of the shaft 8 and toward the axially fixed flange 10. A similar additional (compensating or balancing) chamber can be defined by the hydraulic system which initiates and controls axial movements of the flange 4 relative to the axially fixed flange 6 of the pulley 3.

Figure 2:
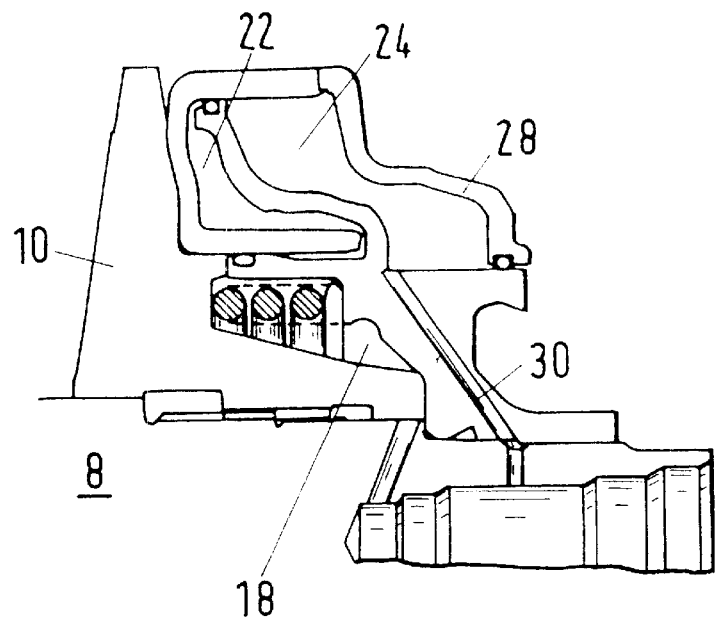
FIG. 2 is a fragmentary schematic axial sectional view of an adjustable pulley of conventional design which can be utilized in the transmission of FIG. 1 as a substitute for pulleys embodied in such transmission.

FIG. 2 illustrates one mode of regulating the flow of hydraulic fluid into and from the additional chamber 24. An elongated bore 30 which makes an acute angle with the axis of the pulley 9' can receive or discharge hydraulic fluid from or to a source (such as a pump shown in U.S. Pat. No. 5,667,448 to Friedmann) by way of a channel in the shaft 8.

Figure 3:
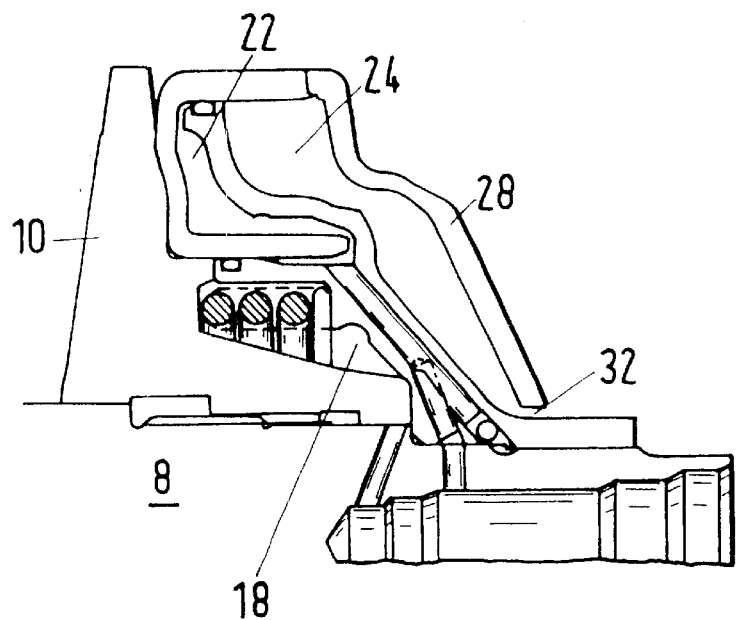
FIG. 3 illustrates a known modification of the pulley shown in FIG. 2.

FIG. 3 shows a portion of a pulley 9" wherein the additional chamber 24 can receive or discharge hydraulic fluid by way of an annular or arcuate clearance 32 between the radially innermost portions of the walls 26, 28.

It is further known to provide at least one channel or passage (not shown) in the wall 26 and to provide such channel or passage with a suitable flow restrictor (e.g., a constriction) which determines the extent of leakage of hydraulic fluid between the chambers 22 and 24. Alternatively, the seal between the radially outermost portion of the wall 26 and the adjacent portion of the wall 28 can be designed to permit a certain controlled amount of hydraulic fluid to leak between the chambers 22 and 24.

The just discussed four prior proposals to counteract the influence of centrifugal force upon the circulating bodies of hydraulic fluid in the plenum chamber(s) 18 and/or 22 and/or 24 exhibit the following drawbacks:

If the flange 12 is located at a maximum axial distance from the flange 10 (i.e., if the motor vehicle having a power train which embodies the transmission 1 is set to operate in overdrive), the volume of hydraulic fluid in the additional chamber 24 has risen to a maximum value. If the ratio of the transmission 1 should be changed, abruptly, to operate in underdrive, the flange 12 must be rapidly shifted axially of the shaft 8 and toward the axially fixed flange 10. In other words, it is necessary to abruptly reduce the volume of the additional chamber 24. This cannot be achieved as rapidly as desired, i.e., within an optimum short or extremely short interval of time, because the rate of flow of fluid through the channel 30 of FIG. 2 cannot be increased at will, and the same applies for the rate of flow of hydraulic fluid through the clearance 32 shown in FIG. 3 and/or for the aforementioned additional conventional undertakings (flow restrictors and seals). The only remedy which is available in transmissions embodying the feature (30) of FIG. 2 or the feature (32) of FIG. 3 is to abruptly increase the pressure of hydraulic fluid in the plenum chamber 22 to an unrealistically high (i.e., practically unachievable) value. Furthermore, the pronounced fluid pressure in the additional chamber (24) opposes the pressure which the conical surfaces of the flanges 10, 12 should apply against the end faces of adjacent links of the chain 16, i.e., the fluid in the chamber 24 opposes and prevents the achievement of that pressure between the flanges 10, 12 and the chain 16 which has been selected by the hydraulic control system for the transmission 1.

Figure 4:
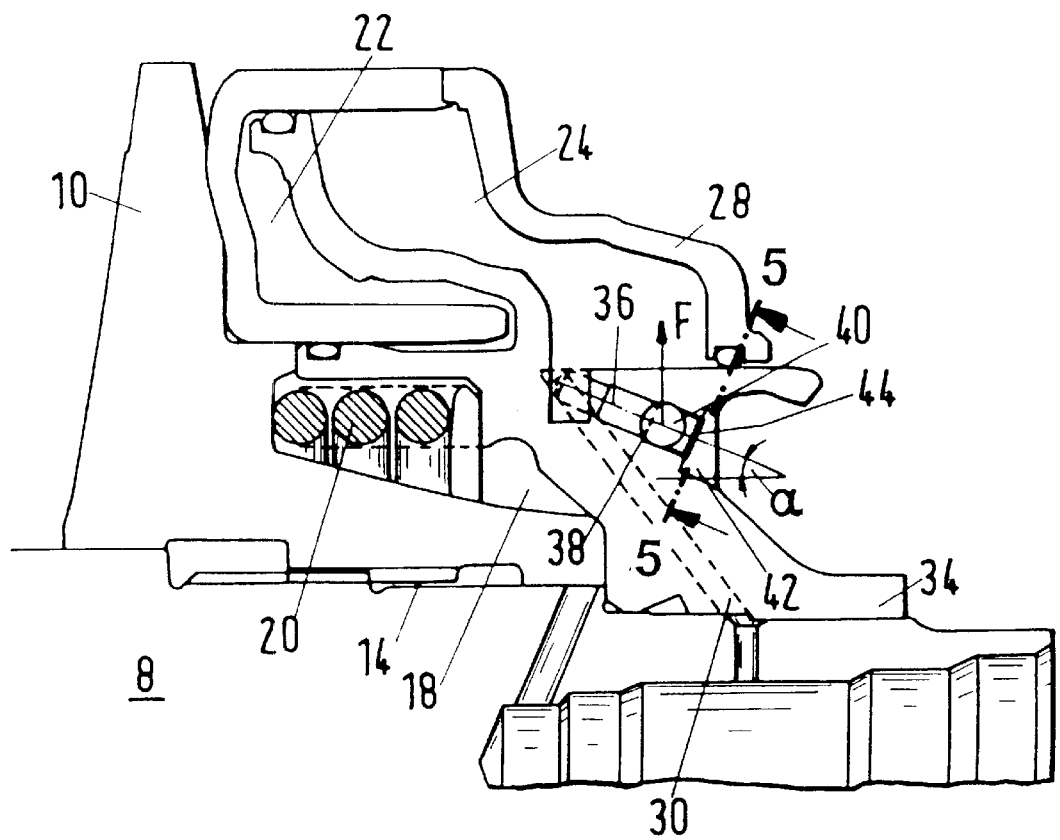
FIG. 4 is a fragmentary axial sectional view of an adjustable pulley or sheave which embodies one form of the present invention.
Figure 5:
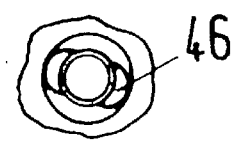
FIG. 5 is a fragmentary axial sectional view as seen in the direction of arrow from the line 5—5 of FIG. 4.

FIGS. 4 and 5 illustrate one presently preferred effective mode of overcoming the aforediscussed drawbacks of conventional adjustable pulleys for use in continuously variable transmissions of the type shown in FIG. 1. Those parts of the improved adjustable pulley 109 shown in FIG. 4 which are identical with or clearly analogous to the corresponding parts of the pulley 9' shown in FIG. 2 are denoted by similar reference characters. An advantage of the puley 109 is that (a) the influence of centrifugal force upon the pressure between the conical flanges 10, 12 and the links of the chain 16 (not shown in FIG. 4) is nil or negligible or acceptable, and (b) it is possible to rapidly shift between overdrive and underdrive because it is possible to evacuate substantial quantities of hydraulic fluid from the additional chamber 24 within short or extremely short intervals of time.

The shaft 8 of the pulley 109 of FIG. 4 carries a member 34 which constitutes the housing or body of a novel valve and shares the angular movements of the shaft 8. The passage or channel 30 (which establishes or can establish one path for the flow of a hydraulic fluid between one or more ports 7 in the shaft 8 and the additional chamber 24) is provided in the valve body 34 and communicates with the radially innermost portion of the chamber 24. The latter is further provided with an outlet in the form of an elongated channel 36. The surface surrounding the outlet 36 defines an annular seat 38 for a spherical valving element 40 which prevents the outflow of fluid from the chamber 24 while the pressure in this camber is below a predetermined threshold value and the shaft 8 rotates.

The angle α denotes the inclination of the axis of the outlet 36 relative to the axis of the pulley 109. The radially inner end of the outlet 36 communicates with a recess or compartment 42 which is provided in the valve body 34 and from which the fluid can flow to a sump or to another reservoir, not shown. The recess 42 accommodates a ring-shaped preferably resilient retainer 44 which confines the spherical valving element 40 to movements within the radially inner portion of the outlet 36, i.e., between the seat 38 and the retainer 44.

FIG. 5 shows that the outlet 36 is provided with lateral extensions 46 which permit additional quantities of hydraulic fluid to escape from the chamber 24 as soon as the valving element 40 is lifted off its seat 38.

The valve including the body or housing 34 and the element 40 can be said to constitute or to act as a relief valve which opens automatically whenever it becomes necessary to rapidly evacuate a large quantity of hydraulic fluid from the chamber 24.

The operation of the adjustable pulley 109 embodying the structure of FIGS. 4 and 5 is as follows:

As the RPM of the shaft 8 increases, the valving element 40 of the relief valve 34, 40 bears upon the seat 38 with a closing force SK=F×sin α. The angle α is selected in such a way that the closing force exerted by the valving element 40 exceeds somewhat the force of fluid which is confined in the plenum chamber 24 and in the adjacent portion of the outlet or channel 36 (up to the seat 38). This ensures that the valve 34, 40 is closed whenever the shaft 8 rotates. The character F denotes in the preceding equation that force which is generated by centrifugal force and acts upon the valving element in a direction radially of the axis of the shaft 8.

If the pressure of fluid in the plenum chamber 22 is increased to effect a rapid (such as abrupt) axial shifting of the flange 12 toward the flange 10, this entails a rise of fluid pressure in the chamber 24, i.e., the pressure of fluid in the chamber 24 and in the adjacent portion of the outlet or channel 36 rises to a value at which the valving element 40 is lifted off the seat 38 and establishes a further path for the flow of fluid from the chamber 24, namely a path leading into the recess 42, at a rate which is required to ensure abrupt axial shifting of the flange 12 toward the flange 10. The provision of the aforediscussed extensions 46 (FIG. 5) of the outlet or channel 36 contributes to the ability of the relief valve to permit abrupt outflow of a substantial quantity of fluid from the additional chamber 24. The result is rapid shifting of the transmission from overdrive to underdrive.

It will be appreciated that the illustrated relief valve including the parts 34, 40, 44 can be modified in a number of ways without departing from the spirit of the invention. For example, the relief valve can constitute a prefabricated unit (module) which can be mounted on the shaft 8 in such a way that it can permit pronounced outflow of hydraulic fluid from the additional plenum chamber 24 under the above outlined circumstances and for the aforementioned purpose. Furthermore, the relief valve could employ one or more anchor-shaped valving elements.

As concerns the material(s) of the relief valve, one can choose among a practically unlimited number of materials and/or substances as long as they do not adversely affect the hydraulic fluid in the chamber 24 and/or vice versa.

Since the inertia of the valving element constitutes a desirable feature of the illustrated relief valve, it is often advisable to employ a relatively heavy spherical or otherwise configurated valving element the inertia of which tends to normally maintain it in requisite sealing engagement with the seat 38.

It is also possible to select a relief valve which is indirectly operated by centrifugal force or is normally maintained in closed or sealing position or condition in another suitable way, e.g., electrically and/or hydraulically in dependency upon the RPM of the shaft 8. Still further, it is possible to employ two or more relief valves.

The improved relief valve has been found to be particularly effective and useful in conjunction with that adjustable pulley (see the pulley 9 in FIG. 1) of a continuously variable transmission which is driven by the prime mover by way of another pulley (such as the pulley 3 shown in FIG. 1) and an endless flexible element (such as the chain 16 shown in FIG. 1).

Certain important advantages of the improved pulley and of a transmission employing such pulley can be summarized as follows: The closing or sealing force of the improved relief valve invariably and automatically conforms to the prevailing RPM of the pulley, i.e., the relief valve can remain closed at each RPM of the shaft for the flanges of the pulley. However, the relief valve can permit fluid to escape from the additional chamber 24 as soon as the fluid pressure in such chamber at least slightly exceeds the preselected maximum permissible pressure which develops as a result of movement of the flange 12 away from the flange 10. This renders it possible to rapidly change the ratio of the transmission, i.e., to rapidly move the flange 12 away from the flange 10.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of adjustable pulleys for use in continuously variable fluid-operated transmissions and, therefore, such adaptations should and are intended to be comprehended within the meaning and range of equivalence of the appended claims.

What is claimed is:

1. An adjustable pulley comprising:

a shaft rotatable about a predetermined axis at a plurality of different speeds;

a first flange rotatable with said shaft;

a second flange rotatable with and movable axially of said shaft toward and away from said first flange;

fluid-operated means for moving said second flange toward and away from said first flange, including at least one first chamber arranged to receive a hydraulic fluid to thus generate a force tending to move said second flange toward said first flange, and an additional chamber arranged to receive and confine hydraulic fluid at a plurality of different pressures to thus generate a variable second force tending to move said second flange away from said first flange; and a valve rotatable with said shaft and arranged to regulate the outflow of hydraulic fluid from said additional chamber in dependency upon the rotational speed of said shaft.

2. The pulley of claim 1, wherein said additional chamber has at least one outlet for the flow of hydraulic fluid and said valve includes at least one mobile valving element arranged to regulate the outflow of hydraulic fluid from said additional chamber by way of said at least one outlet.

3. The pulley of claim 2, wherein said valve further comprises a valve body for said at least one mobile valving element, said valve body being connected for rotation with at least one of said shaft, said first flange and said second flange and said at least one outlet being provided in said valve body.

4. The pulley of claim 2, wherein said at least one valving element is movable to a first position under the action of centrifugal force to seal said at least one outlet and to at least one second position, in which said outlet is open, when said second force increases to a predetermined value.

5. The pulley of claim 2, wherein said second force varies as a function of variations of fluid pressure in said additional chamber.

6. The pulley of claim 2, wherein said valve body has a seat for said at least one valving element, said at least one valving element being acted upon by centrifugal force when said shaft rotates to bear upon said seat with a third force which increases in response to increasing centrifugal force.

7. The pulley of claim 6, wherein said at least one outlet includes a channel provided in said valve body and being inclined relative to said axis.

8. The pulley of claim 6, wherein the magnitude of said third force exceeds the magnitude of said second force by a value which is at least substantially independent of the magnitude of centrifugal force acting upon the fluid in said additional chamber and being opposed by said at least one valving element.

9. The pulley of claim 2, wherein said at least one valving element is a sphere.

10. The pulley of claim 2, wherein said additional chamber includes a first portion nearer to and a second portion more distant from said axis, and an inlet for admission of hydraulic fluid into said first portion.

11. The pulley of claim 2, wherein said additional chamber is defined by a first wall affixed to said shaft and a second wall affixed to said second flange.

12. The pulley of claim 2, wherein said at least one first chamber is defined by a first wall affixed to said shaft and a second wall affixed to said second flange.

13. The pulley of claim 1, wherein said shaft includes a wall disposed between said at least one first chamber and said additional chamber.

14. A continuously variable transmission comprising:

a first adjustable pulley rotatable about a first axis; and a second adjustable pulley rotatable about a second axis by said first pulley by way of an endless flexible element trained over said pulleys, said second pulley comprising a shaft rotatable about said second axis, a first flange rotatable with said shaft, a second flange rotatable with and movable axially of said shaft toward and away from said first flange, fluid-operated means for moving said second flange toward and away from said first flange including at least one first chamber arranged to receive a hydraulic fluid to thus generate a first force tending to move said second flange toward said first flange and an additional chamber arranged to receive and confine hydraulic fluid at a plurality of different pressures to thus generate a variable second force tending to move said second flange away from said first flange, and a valve rotatable with said shaft, said valve being spaced apart from said second axis and being arranged to regulate the outflow of hydraulic fluid from said additional chamber in dependency upon the rotational speed of said shaft.

15. The transmission of claim 14, wherein said valve comprises a valve body arranged to share rotary movements of said shaft about said second axis and having a channel inclined relative to said second axis and provided with a seat, and a valving element movable in said channel against said seat under the action of centrifugal force which develops in response to rotation of said shaft about said second axis so that the force with which said valving element bears upon said seat to prevent the outflow of fluid from said additional chamber by way of said channel increases in response to increasing rotational speed of said shaft about said second axis.

16. The transmission of claim 15, wherein the force SK with which said valving element bears upon said seat under the action of centrifugal force equals F×sin α wherein F is the centrifugal force acting upon said valving element and a is the extent of inclination of said channel relative to said second axis.

* * * * *